(12) United States Patent
Ohayon et al.

(10) Patent No.: US 10,637,864 B2
(45) Date of Patent: Apr. 28, 2020

(54) CREATION OF FICTITIOUS IDENTITIES TO OBFUSCATE HACKING OF INTERNAL NETWORKS

(71) Applicant: CA, Inc., San Jose, CA (US)

(72) Inventors: Almog Ohayon, Tel Aviv (IL); Guy Franco, Tel Aviv (IL); Roi Abutbul, Be'er Sheva (IL)

(73) Assignee: CA, Inc., San Jose, CA (US)

( * ) Notice: Subject to any disclaimer, the term of this patent is extended or adjusted under 35 U.S.C. 154(b) by 121 days.

(21) Appl. No.: 15/588,280

(22) Filed: May 5, 2017

(65) Prior Publication Data

US 2017/0324773 A1 Nov. 9, 2017

Related U.S. Application Data

(60) Provisional application No. 62/332,264, filed on May 5, 2016.

(51) Int. Cl.
*H04L 29/06* (2006.01)

(52) U.S. Cl.
CPC .............. *H04L 63/10* (2013.01); *H04L 63/08* (2013.01); *H04L 63/1416* (2013.01)

(58) Field of Classification Search
None
See application file for complete search history.

(56) References Cited

U.S. PATENT DOCUMENTS

| | | |
|---|---|---|
| 6,981,155 B1 | 12/2005 | Lyle et al. |
| 7,117,532 B1 | 10/2006 | Lyle et al. |
| 7,152,239 B1 | 12/2006 | Lyle et al. |
| 7,461,402 B1 | 12/2008 | Lyle et al. |
| 8,528,091 B2 | 9/2013 | Bowen et al. |
| 8,738,639 B1 | 5/2014 | Zafar et al. |
| 9,306,940 B2 | 4/2016 | Brock |
| 10,225,284 B1 | 3/2019 | Evans et al. |
| 2002/0046351 A1 | 4/2002 | Takemori |

(Continued)

OTHER PUBLICATIONS

U.S. Appl. No. 15/637,765, of Ohayon, A., et al., filed Jun. 29, 2017.

(Continued)

*Primary Examiner* — Joseph P Hirl
*Assistant Examiner* — Hassan Saadoun
(74) *Attorney, Agent, or Firm* — FisherBroyles, LLP

(57) ABSTRACT

Introduced here are security techniques for networks. More specifically, fictitious identities (also referred to as "bogus identities") can be willfully created and injected into the network in order to obfuscate those who are not authorized to access the network. For example, such techniques may be used to befuddle hackers attempting to breach an internal network. The fictitious identities can be created by bypassing the operating system of computing device(s) residing within the network and deploying the fictitious identities within an operating system process responsible for implementing a security policy. Such action utilizes a limited amount of memory. The fictitious identities create a false visual of the network that is visible to any threat, regardless of where the threat is located in the network. Moreover, the fictitious identities may not infringe upon the topology of the network or affect the ability of authenticated users to continue using the network.

21 Claims, 6 Drawing Sheets

(56) References Cited

U.S. PATENT DOCUMENTS

| | | |
|---|---|---|
| 2002/0066034 A1 | 5/2002 | Schlossberg et al. |
| 2002/0095607 A1 | 7/2002 | Lin-Hendel |
| 2002/0157021 A1 | 10/2002 | Sorkin et al. |
| 2002/0162017 A1 | 10/2002 | Sorkin et al. |
| 2005/0187894 A1* | 8/2005 | Pletcher .................. G06F 8/71 |
| 2006/0026682 A1 | 2/2006 | Zakas |
| 2006/0149674 A1 | 7/2006 | Cook et al. |
| 2006/0174323 A1 | 8/2006 | Brown et al. |
| 2007/0282768 A1* | 12/2007 | Chang .................. G06N 5/02 |
| | | 706/16 |
| 2007/0289018 A1 | 12/2007 | Steeves et al. |
| 2010/0077483 A1 | 3/2010 | Stolfo et al. |
| 2012/0030576 A1 | 2/2012 | Bell et al. |
| 2013/0151607 A1* | 6/2013 | Faller .................. G06Q 10/10 |
| | | 709/204 |
| 2013/0263226 A1* | 10/2013 | Sudia .................. H04L 63/1466 |
| | | 726/4 |
| 2015/0012567 A1 | 1/2015 | Powell et al. |
| 2015/0012571 A1 | 1/2015 | Powell et al. |
| 2015/0213032 A1 | 7/2015 | Powell et al. |
| 2015/0326608 A1 | 11/2015 | Shabtai et al. |
| 2016/0026798 A1 | 1/2016 | Martini et al. |
| 2017/0109370 A1 | 4/2017 | Newhouse |
| 2017/0134423 A1 | 5/2017 | Sysman et al. |
| 2017/0171244 A1 | 6/2017 | Vissamsetty et al. |
| 2017/0195346 A1* | 7/2017 | Be'ery .................. H04L 63/0428 |
| 2017/0206353 A1 | 7/2017 | Jai et al. |
| 2017/0289191 A1 | 10/2017 | Thioux et al. |
| 2017/0339185 A1 | 11/2017 | Rozenshein et al. |
| 2017/0366563 A1 | 12/2017 | Volfman et al. |
| 2018/0152477 A1 | 5/2018 | Kakumaru |
| 2018/0159897 A1 | 6/2018 | Kakumaru |
| 2018/0255078 A1 | 9/2018 | Papillon et al. |
| 2019/0089737 A1 | 3/2019 | Shayevitz et al. |

OTHER PUBLICATIONS

U.S. Appl. No. 15/649,512, of Ohayon, A., et al., filed Jul. 13, 2017.
U.S. Appl. No. 15/654,425, of Ohayon, A., et al., filed Jul. 19, 2017.

* cited by examiner

400

401
Install security module on computing device within a network

402
Begin generating fictitious identities to be injected into the operating system of the computing device

403
Format fictitious identities to ensure strong resemblance to valid identities

404
Monitor whether a fictitious identity is used for an attempted access of the network

405
Notify an administrator upon determining the fictitious identity was used in an attempt to access the network

501 Install security module on computing device within a network

502 Generate a fictitious identity for the network

503 Inject the fictitious identity into an operating system process responsible for enforcing a security policy

504 Monitor whether the fictitious identity is used in an attempt to access the network

505 Determine the fictitious identity has been used in an attempt to access the network

506 Identify the individual responsible for the attempted breach as an unauthenticated user of the network

507 Notify an administrator of the attempted breach

FIG. 5

CREATION OF FICTITIOUS IDENTITIES TO OBFUSCATE HACKING OF INTERNAL NETWORKS

CROSS-REFERENCE TO RELATED APPLICATIONS

This application claims priority to U.S. Provisional Patent Application No. 62/332,264 titled "CREATION OF AMBIGUOUS IDENTITIES TO OBFUSCATE HACKING OF INTERNAL NETWORKS" and filed on May 5, 2016, which is incorporated by reference herein in its entirety.

FIELD OF THE INVENTION

Various embodiments pertain to computer-implemented security techniques and, more specifically, to techniques for creating fictitious network identities that obfuscate hackers attempting to penetrate a network and exfiltrate sensitive data.

BACKGROUND

A computer network is a telecommunications network that allows nodes to share resources. More specifically, a computer network is a collection of nodes that are interconnected by communication channels, which allow data and resources to be shared. Examples of nodes include modems, hubs, bridges, switches, routers, servers, computers, mobile phones, etc. The communication channels between the nodes can be established using either wired media or wireless media.

Home networks (e.g., residential Local Area Networks) are typically used to facilitate communication between computing devices installed or used in a home, such as printers, tablet computers, and mobile phones. Enterprise networks, meanwhile, normally enable employees to access vital programs and data that are necessary for the day-to-day operations of an enterprise (e.g., a company). Enterprise networks help connect computing devices across different departments and geographical locations (and, in some instances, workgroup sub-networks), thereby facilitating data accessibility. However, enterprise networks are often an attractive target for unauthorized entities (also referred to as "hackers"), and thus need to be protected. Examples of unauthorized entities include individuals and malicious software ("malware") that may exist on one of the computing devices that resides within the enterprise network.

BRIEF DESCRIPTION OF THE DRAWINGS

Embodiments of the present invention are illustrated by way of example and not limitation in the accompanying drawings, in which like references indicate similar elements. Various objects, features, and characteristics of the present invention will become more apparent to those skilled in the art from a study of the Detailed Description in conjunction with the accompanying drawings.

FIG. 4 depicts a flow diagram of a process for willfully creating fictitious identities for a network that are intended to obfuscate hackers attempting to breach the network.

FIG. 5 depicts a flow diagram of another process for obfuscating hackers attempting to penetrate a network.

Figure 1:
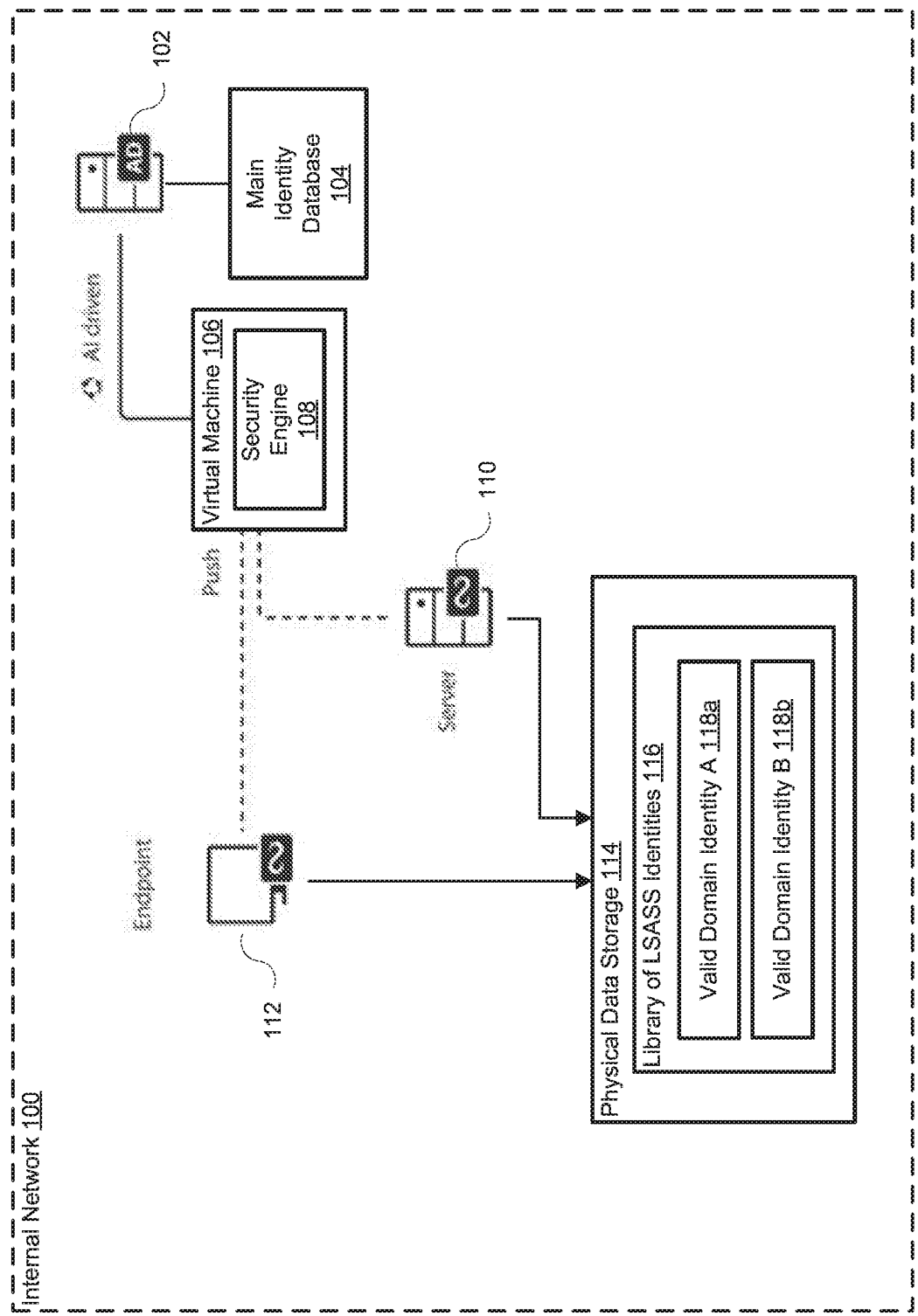
FIG. 1 is a generalized illustration of an internal network (e.g., an enterprise network).

The figures depict various embodiments for the purpose of illustration only. One skilled in the art will readily recognize that alternative embodiments of the technology described herein may be employed without departing from the principles of the present invention.

DETAILED DESCRIPTION

Internal networks (e.g., enterprise networks) often include multiple computing devices that seek to access sensitive data. Each computing device in the internal network executes an operating system (e.g., Microsoft Windows®, Apple OS X®, or Linux® and its variants) that is responsible for enforcing one or more security policies.

For example, a Microsoft Windows® operating system may execute the Local Security Authority Subsystem Service (LSASS) in order to verify users who log into a corresponding computing device by analyzing a library of network identities. More specifically, the LSASS can verify that credentials entered by a user match a record for a valid domain identity that is permitted to access the internal network. Accordingly, the Microsoft Windows® operating system uses the LSASS to manage local and domain authentication of users. However, the valid domain identities managed by the LSASS are often attractive targets for unauthorized users (also referred to as "hackers") because the valid domain identities enable unrestricted access to sensitive enterprise data, such as confidential documents and information.

Introduced here, therefore, are computer-implemented techniques for creating fictitious network identities that obfuscate hackers attempting to penetrate an internal network accessible only to a limited set of authorized users (e.g., employees of an enterprise) and exfiltrate sensitive data. More specifically, various embodiments pertain to willfully creating fictitious network identities (also referred to as "ambiguous identities" or "bogus identities") in order to detect attempts to access the internal network. An attempt to access the internal network using a fictitious network identify is indicative of an unauthorized user attempting to penetrate the internal network.

For example, an internal network can be protected from both external sources and internal sources by using a proprietary deception technique developed for a particular environment (e.g., a Microsoft Windows® operating system, Apple OS X® operating system, or a Linux-based operating system). Oftentimes, the deception techniques described herein will be tailored for one or more particular environments. Similarly, embodiments may be described with reference to certain system configurations or networks (e.g., internal networks for enterprises). However, those skilled in the art will recognize that features of the deception techniques are transferrable across different environments, system configurations, network types, network topologies, etc.

Moreover, the techniques introduced herein can be implemented by programmable circuitry (e.g., one or more microprocessors) appropriate programmed with software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. Accordingly, embodiments may include a machine-readable medium storing instructions that may be used to program a computing device to perform a process. The machine-readable medium may include, but is not limited to, floppy diskettes ("disks") and other removable disks, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic/optical cards, flash memory, or another type of machine-readable medium suitable for storing instructions.

Terminology

Brief definitions of terms, abbreviations, and phrases used throughout the specification are given below.

Reference in this specification to "one embodiment" or "an embodiment" means that a particular feature, structure, or characteristic described in connection with the embodiment is included in at least one embodiment of the disclosure. The appearances of the phrase "in some embodiments" are not necessarily referring to the same embodiments, nor are they necessarily referring to separate or alternative embodiments that are mutually exclusive of one another. Moreover, various features are described that may be exhibited by some embodiments but not others. Similarly, various requirements are described that may be requirements for some embodiments but not others.

Unless the context clearly requires otherwise, the words "comprise" and "comprising" are to be construed in an inclusive sense rather than an exclusive or exhaustive sense (i.e., in the sense of "including, but not limited to"). The terms "connected," "coupled," or any variant thereof includes any connection or coupling between two or more elements, either direct or indirect. The coupling or connection between the elements can be physical, logical, or a combination thereof. For example, two devices may be coupled directly to one another or via one or more intermediary channels/devices. Devices may also be coupled in such a way that information can be passed there between, despite not sharing any physical connection with one another. The words "associate with," meanwhile, mean connecting or relating objects, items, etc.

Where the context permits, words used in the singular sense or the plural sense may also be used in the plural sense or the singular sense, respectively. The word "or," in reference to a list of two or more items, covers all of the following interpretations of the word: any of the items in the list, all of the items in the list, and any combination of the items in the list. If the specification states a component or feature "may," "can," "could," or "might" be included or have a characteristic, that particular component or feature is not required to be included or have the characteristic in every embodiment.

The term "module" refers broadly to software, hardware, and/or firmware components. Modules are typically functional components that can generate useful data or other output using specified input(s). A module may or may not be self-contained. A software program or application may include one or more modules.

The terminology used in the Detailed Description is intended to be interpreted in its broadest reasonable manner, even though it is being used in conjunction with certain embodiments. The terms used in this specification generally have their ordinary meanings in the art, in the context of the disclosure as a whole and in the specific context where each term is used. For convenience, certain terms may be highlighted using, for example, capitalization, italics, and/or quotation marks. However, the use of highlighting has no influence on the scope and meaning of a term. The scope and meaning of a term is the same, in the same context, whether or not it is highlighted.

Consequently, although alternative language and synonyms may be used for some terms, special significance is not to be placed upon whether or not a term is elaborated or discussed herein. A recital of one or more synonyms does not exclude the use of other synonyms. The use of examples anywhere in this specification, including examples of any terms discussed herein, is intended to be illustrative only. These examples are not intended to limit the scope and meaning of the disclosure or of any exemplified term. Likewise, the disclosure is not limited to the various embodiments described below.

System Topology Overview

FIG. 1 is a generalized illustration of an internal network 100. An internal network (also referred to as a "private network") is a network that is accessible only to a limited set of authorized users. Generally, a wide range of information and services are available to authorized users that would not be available to the public from the Internet, such as an enterprise's internal Information Technology (IT) systems. Accordingly, an internal network can constitute an important focal point of internal communication and collaboration by providing a single point by which to access internal resources and/or external resources.

Internal networks (which often use private Internet Protocol (IP) address spaces) are commonly used for home, office, and enterprise local area networks (LANs). As noted above, the internal network 100 is generally accessible only to a limited set of authorized users (e.g., employees of the enterprise), each of whom has at least one valid identity stored on a directory server 102. In some embodiments the directory server 102 is managed by the enterprise associated with the internal network 100, while in other embodiments the directory server 102 is managed by some other entity.

The directory server 102 (also called a "domain controller") can include a main identity database 104 that is used to facilitate a directory service for the internal network 100. For example, the directory server 102 could facilitate the Active Directory (AD) service if the internal network 100 is a Microsoft Windows® domain network. The directory server 102 (and, more specifically, the main identity database 104) is accessible to one or more endpoint devices 112 that reside within the internal network 100. An endpoint device is a network-connected computer hardware device, such as a desktop computer, laptop computer, tablet computer, mobile phone, or other specialized hardware.

The directory server 102 includes the valid identities for all authorized users of the internal network 100, and thus is able to enforce security policies for the endpoint(s) 112 by authenticating/authorizing users as they attempt to access the internal network 100. More specifically, when a user logs into an endpoint that is part of the internal network 100, the directory service compares the submitted credentials (e.g., username and password) to the main identity database 104 in order to determine whether the user is authorized to access internal network resources.

The directory server 102 is accessible to a virtual machine 106 that includes one or more security programs/routines for creating fictitious identities for the internal network 100. While the fictitious identities may appear substantially similar to the valid identities, they typically cannot be used to access internal network resources. Note, however, that in some embodiments the fictitious identities may permit access to a secure environment within the internal network 100 where entries by unauthorized users can be diverted, studied/monitored, etc.

A network administrator can physically or virtually install the virtual machine 106 on a computing device within the internal network 100, and then configure the virtual machine 106 specifically for the internal network 100. For example, the virtual machine 106 may be installed on a server 110 or an endpoint device, such as a mobile phone, tablet computer, laptop computer, personal computer, etc. The network administrator may be associated with the enterprise, a network service responsible for managing the internal network 100, or a security service responsible for managing the virtual machine 106. The virtual machine 106 can read elements (e.g., computer metadata and/or users' metadata) from the main identity database 104 of the directory server 102 in order to model the internal network 100. However, the main identity database 104 is generally left unchanged (i.e., the virtual machine 106 typically uses the main identity database 104 as a read-only element for modeling).

Modeling may be driven by a security engine 108 that is executed by the virtual machine 106 and employs artificial intelligence (AI) algorithms to learn the characteristics of the internal network 100. For example, various machine learning algorithms/techniques could be employed by the security engine 108, including Naïve Bayes Classifier algorithms, K Means Clustering algorithms, Support Vector Machine algorithms, linear regression, logic regression, artificial neural networks, etc. These algorithms/techniques may be chosen based on application (e.g., supervised or unsupervised learning). Moreover, these algorithms/techniques could be optimized based on feedback from the network administrator as to whether fictitious identities created by the virtual machine 106 match the syntax of the valid identities stored in the main identity database 104. Accordingly, the security engine 108 can model existing network elements (e.g., valid identities for authorized users) and create new network elements for the purpose of deception.

Once the virtual machine 106 has been installed and configured, the security engine 108 can fetch the necessary information from the main identity database 104 on the directory server 102. For example, the virtual machine 106 may retrieve examples of valid identities in order to discover the syntax of the valid identities. The syntax may be influenced by different naming techniques and/or stylistic markers that must be mimicked in order to create convincing fictitious identities. The security engine 108 can then create new fictitious identities using the AI algorithm(s) that take into account the syntax of the valid identities stored in the main identity database 104. In some embodiments the fictitious identities are suitable for the internal network 100 as a whole, while in other embodiments the fictitious identities are suitable for one or more specific enterprise database(s).

The fictitious identities can then be installed/injected into some or all of the computing devices that reside within the internal network 100, such as the server 110 and the endpoint device(s) 112. Each computing device in the internal network 100 executes an operating system (e.g., Microsoft Windows®, Apple OS X®, or Linux® and its variants) that is responsible for enforcing one or more security policies, including those security techniques enabled by the security engine 108 of the virtual machine 106.

For example, a Microsoft Windows® operating system may execute the Local Security Authority Subsystem Service (LSASS) in order to verify users who log into a corresponding computing device by analyzing a library of LSASS identities 116 (also referred to as the "LSASS library") that is stored within physical data storage 114, such as random-access memory (RAM). The LSASS library 116 can include a record for each valid identity 118a-b that is permitted to access the internal network 100. More specifically, the LSASS can verify that credentials entered by a user match a record for a valid identity 118a-b that is permitted to access the internal network 100.

Consequently, the LSASS library 116 can (and often does) include multiple domain identity records 118a-b corresponding to authenticated users of the internal network 100 (e.g., employees of the enterprise). As shown in FIG. 1, each computing device within the enterprise network 100 can include a physical data storage 114 that contains a LSASS library 116. In addition to verifying users logging onto the internal network 100 from a computing device, the LSASS may also be configured to handle password changes, create access tokens, write to a security log (e.g., the Windows Security Log), etc.

Conventionally, the Microsoft Windows® operating system uses the LSASS in each endpoint device 112 within the enterprise network 100 to manage local and domain authentication for users. However, the valid identities 118a-b stored in the endpoint device(s) 112 are often attractive targets for unauthorized users (also referred to as "hackers") because the valid identities 118a-b enable unrestricted access to sensitive enterprise data, such as confidential documents and information.

In some embodiments, the virtual machine 106 is associated with a security service (i.e., an individual or an enterprise) that is responsible for overseeing implementation of the security techniques described herein. However, the security service typically has a limited presence on the internal network 100 that is largely or entirely invisible to authorized users of the internal network 100. For example, the security service's only presence may be the virtual machine 106 and portions of code that are injected into the memory of the computing devices (e.g., the server 110 and the endpoint device(s) 112) that reside within the internal network 100.

Information that is learned by the virtual machine 106 from its implementation in the internal network 100 could be used by the security service to improve the security technique(s) used to protect the internal network 100 or some other network (e.g., the internal network of another enterprise). Said another way, the security service can improve the ability of the virtual machine 106 (and, more specifically, the security engine 108) to detect and react to network threats by learning from one or more unrelated internal networks over time.

Figure 2:
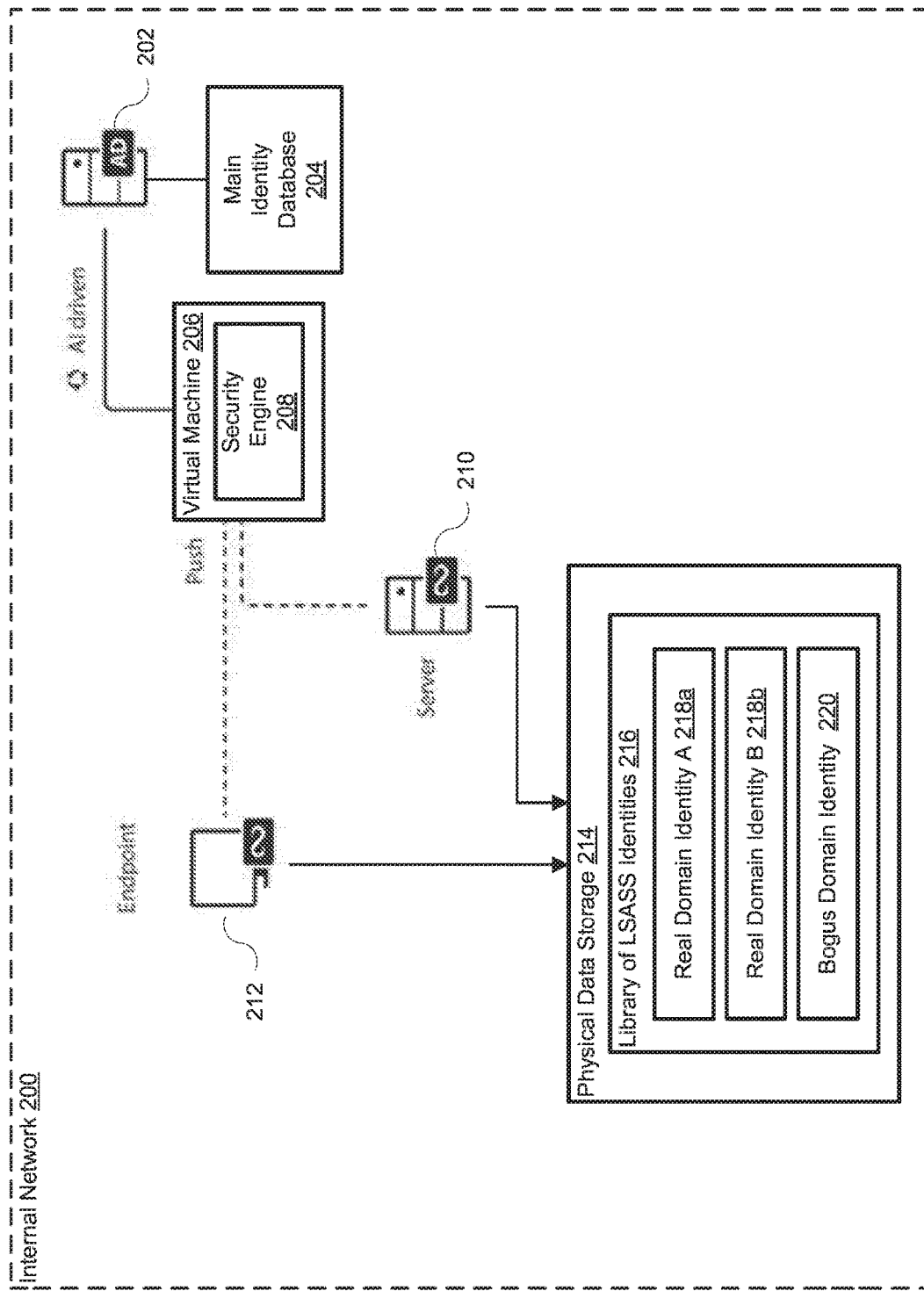
FIG. 2 is a generalized illustration of an internal network after the security engine of a virtual machine has performed a security technique.

FIG. 2 is a generalized illustration of an internal network 200 (e.g., internal network 100 of FIG. 1) after the security engine 208 of a virtual machine 206 has performed a security technique. Performance may require, for example, that the security engine 208 install a security program or routine that executes on each endpoint device 212 within the internal network 200.

Microsoft Windows® operating systems may use the LSASS in each endpoint device 212 within the internal network 200 for local and domain authentication of its users. As shown in FIG. 2, the security engine 208 can cause one or more additional or "bogus" identities 220 to be generated in the LSASS. These willfully-introduced fictitious identities obfuscate hackers who are attempting to access more endpoint devices 212 on the internal network 200. For example, a hacker may attempt to exfiltrate sensitive data that is only accessible to a subset of all authorized users (and thus a subset of all valid identities). In some embodiments, the security engine 208 is executed locally (e.g., on the endpoint device itself) and the fictitious identities are injected directly into the LSASS library 216 that resides within physical data storage 214. In other embodiments, the security engine 208 is executed remotely (e.g., on a network-connected server 210) and the fictitious identities are transmitted to the endpoint device(s) 212 for injection into the LSASS library 216.

Additionally or alternatively, a security service may employs its own security mechanism on some or all of the endpoint device(s) 212 that allows the security service to bypass the operating system of a computing device (e.g., an endpoint device 212 or a network-connected server 210) and inject one or more fictitious identities into the LSASS library 216. For example, the security service may upload the fictitious identities to the virtual machine 206, which is responsible for injecting the fictitious identities into the LSASS library 216 of the computing device. The security mechanism may provide a false perspective to the hacker on the computing device regarding the fictitious identities.

More specifically, the security service may bypass the operating systems of the computing devices (e.g., the endpoint device(s) 212 and/or network-connected servers 210) that reside within the internal network 200, and then deploy fictitious identities on the LSASS of some or all of these computing devices using a limited amount of memory. The fictitious identities create a false visual of the internal network 200 that is observable to hackers regardless of where the hacker is attempting to penetrate the internal network 200 (i.e., at any location on the network).

The security techniques described herein can also enable threats that are patrolling/investigating the false visual of the internal network 200 to be identified in near real time. For example, the security engine 208 of the virtual machine 206 could react once a hacker attempts to access the internal network 200 using one of the fictitious identities. Because the fictitious identities are unknown to the hacker, the hacker may attempt to use brute force to breach the internal network 200 (i.e., attempt to use the credentials for each identity in the LSASS library 216 regardless of whether it is valid or fictitious). However, the security engine 208 (or some other module executed by the virtual machine 206, such as a monitoring module) can easily detect such conduct and notify an appropriate entity, such as an administrator responsible for managing the internal network 200, the security engine 208, or both. The administrator may be associated with the enterprise, the security service, or some other entity.

For example, when the hacker uses one of the fictitious identities in an attempt to penetrate the internal network 200, a notification (e.g., an email, text message, push notification, or alert) could be generated and transmitted to an appropriate entity so that steps can be taken to address the attempted breach. Monitoring usage of fictitious identities can be performed in several different ways. In some embodiments the security engine 208 continually monitors attempts to access the internal network 200 in real time to identify abnormalities, while in other embodiments the security engine 208 periodically analyzes access logs to identify abnormalities.

Figure 3:
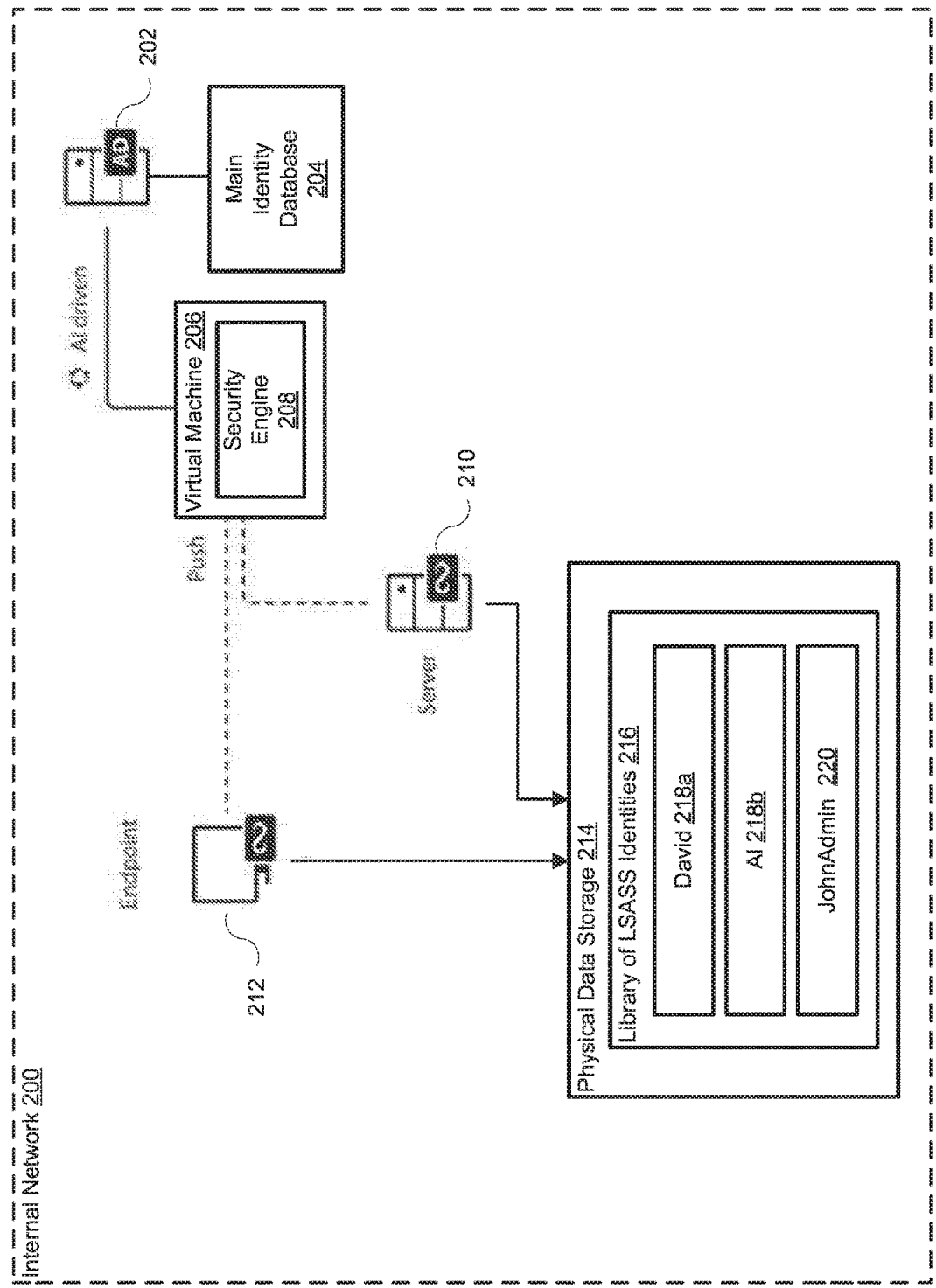
FIG. 3 depicts how a Local Security Authority Subsystem Service (LSASS) library can include both valid identities and fictitious identities that have been willfully introduced into the internal network.

FIG. 3 depicts how the LSASS library 216 can include both valid identities and fictitious identities that have been willfully introduced into the internal network 200 (e.g., by the security engine 208 of the virtual machine 206 or by a computing device responsive to receiving instructions from the security engine 208). Each fictitious identity 220 appears to be a valid identity (i.e., a real/authentic identity) from the perspective of a hacker.

In fact, each fictitious identity 220 may appear substantially identical to those valid identities a hacker is likely to attempt to manipulate as part of a data theft. Here, for example, the fictitious identity 200 is named "JohnAdmin" so that it is indistinguishable from the valid identities 218a-b (i.e., "David" and "Al"). Fictitious identities may be modeled based on valid identity characteristics discovered through a parsing of the main identity database 204 maintained by a directory server 202 of the internal network 200. However, fictitious identities cannot actually be used for local authentication or domain authentication as they only appear to be valid. That is, there are not actually any permissions granted to the fictitious identities, although a hacker will still be able to interact with the fictitious identities as if they were valid identities.

The security techniques described herein also enable threats to the internal network 200 to be more readily discovered and neutralized. More specifically, the fictitious identities can be used trick a hacker who has attempted to obtain information regarding the internal topology of users, servers, and endpoint devices.

Fictitious identities, which have no network permissions but are otherwise identical to valid identities, hold a true presence on the internal network 200. This ensures that, upon connection to other network components and computing devices (e.g., endpoint device(s) 212 and network-connected servers 210), the ability to distinguish between the valid identities and the fictitious identities is outmost limited. Said another way, only code executed by the virtual machine 206 and/or the security engine 208 can distinguish which identities are bogus. Moreover, such a technique substantially limits the ability of a hacker to detect valid identities for the internal network 200, and then use this information to disrupt network activities (e.g., by spreading malware, extending hacker persistence, and/or obtaining full remote control over the internal network).

In some embodiments, the security engine 208 continually or periodically adapts to changes in the internal network 200 by updating the bogus identities to reflect changes in database topology, permissions, identity/credential naming scheme, etc. For example, the security engine may continually or periodically monitor the main identity database 204 of the directory server 202 in order to discover modifications to credential syntax. Because consistent syntax is important to creating convincing fictitious identities, the security engine 208 typically modifies the fictitious identities so that they are consistent with the naming technique, stylistic markers, etc., of the valid identities.

Creation of the fictitious identities also does not infringe upon the composition of the internal network 200 as a whole or the ability of authorized users to continue legitimate usage of the internal network 200. Instead, the security techniques described herein may be entirely or substantially unobservable/unnoticeable to authorized users of the internal network 200 (e.g., employees of an enterprise).

Note that in some embodiments a network-connected server associated with the security service implements the security technique(s) without causing any change to the general topology of the internal network 200. Accordingly, the topology of the internal network 200 may remain substantially undisturbed even though the internal network 200 has increased protection from unauthorized users.

FIG. 4 depicts a flow diagram of a process 400 for willfully creating fictitious identities for a network that are intended to obfuscate hackers attempting to breach the network. The network is typically a private network (e.g., a home, office, or enterprise network).

Initially, a virtual machine that includes a security engine (also referred to as a "security module") is installed on a computing device that resides within the network (step 401). As noted above, the security module could also additionally or alternatively be installed on a security server that is communicatively coupled to the network via a secure link. The computing device may be a server or endpoint device (e.g., a desktop computer, laptop computer, tablet computer, mobile phone, or other specialized hardware) that resides within the network. Connecting to the network generally allows the computing device to access sensitive information. Thus, such a connection must be protected from unauthorized users (e.g., hackers).

Once installed, the security module can begin generating fictitious identities that are injected into the operating system of the computing device (step 402). More specifically, the security module can begin creating fictitious identities that are accessible to an operating system process that is responsible for enforcing a security policy on the computing device. For example, a computing device executing a Microsoft Windows® operating system may have fictitious identifies injected into the LSASS (which also includes one or more valid identities corresponding to authorized users of the network). However, these fictitious identities cannot actually be used to gain access to the network.

In some embodiments, the fictitious identities are formatted to ensure a strong resemblance to the valid identities (step 403). Because the fictitious identities are intended to obfuscate hackers attempting to breach the network, the fictitious identities generally appear identical to the valid identities from every potential access point (e.g., every network-connected server and endpoint device that resides within the network). Consequently, a hacker may be unable to determine which identities are bogus even if the hacker investigates/analyzes the identities from different access points.

The security module can then begin monitoring whether any of the fictitious identities have been used in an attempt to access the network (step 404). Because authorized users of the network are generally unaware that the security technique has even been implemented, such an event is typically indicative of a hacker attempting to breach the network. Authorized users can continue to enter credentials corresponding to their valid identities and use the network without any disruption because the valid identities are left unchanged. The security module can continually monitor individual attempts to access the network and/or periodically review access logs that indicate which identities were used to log into the network.

Upon determining that one of the fictitious identities was used in an attempt to access the network, the security module may notify an administrator (step 405). Because the security module need only monitor a limited subset of all identities in the LSASS (i.e., only the fictitious identities), the administrator could be notified in near real time that an unauthorized user is attempting to breach the network. Consequently, the administrator can take appropriate steps to address the attempted breach before any damage is done to sensitive information within the network. For example, discovery of an attempted breach may prompt the administrator to alter network permissions, implement additional security measures, halt network access, etc. The security module may also perform these action(s) automatically on behalf of the administrator (i.e., without receiving user input). In such embodiments, the appropriate action(s) may be chosen based on the severity of the attempted breach, the frequency of attempted breaches, etc.

FIG. 5 depicts a flow diagram of another process 500 for obfuscating hackers attempting to penetrate a network. Initially, a security module is installed on a computing device that resides within a network (step 501).

The security module can then generate a fictitious identity for the network (step 502). For example, the security module may analyze valid identities corresponding to authorized users of the network in order to identify a syntax, and then create the fictitious identity in accordance with the syntax. Such action ensures that the fictitious identity is indistinguishable from the valid identities from the perspective of unauthorized/authorized users of the network.

The security module then injects the fictitious identity into an operating system process responsible for enforcing a security policy on the computing device (step 503). For example, the operating system process may be the LSASS when the computing device executes a Microsoft Windows® operating system.

The security module can monitor whether the fictitious identity has been used in an attempt to access the network (step 504). For example, the security module may continually monitor attempts to access the network in real time to identify abnormalities and/or periodically analyze access log(s) to identify abnormalities.

In some instances, the security module will determine that the fictitious identity has been used in an attempt to penetrate the network (step 505). In such scenarios, the security module can identify the individual responsible for the attempted breach as an unauthenticated user of the network (step 506). Moreover, the security module may notify an administrator of the attempt (step 507). For example, the security module may cause an email message to be transmitted to an email address associated with the administrator, a text message to be transmitted to a phone number associated with the administrator, a push notification to be presented by an application running on a computing device associated with the administrator, and/or an alert to be generated by a software program running on a computing device associated with the administrator. The administrator could be responsible for managing the network, the security module, or both.

Unless contrary to physical possibility, it is envisioned that the steps described above may be performed in various sequences and combinations. For example, in some embodiments the one or more fictitious identities are created prior to the security module being installed on a computing device that resides within the network. That is, some or all of the fictitious identities may be pre-set. Additional steps could also be included in some embodiments.

Processing System

Figure 6:
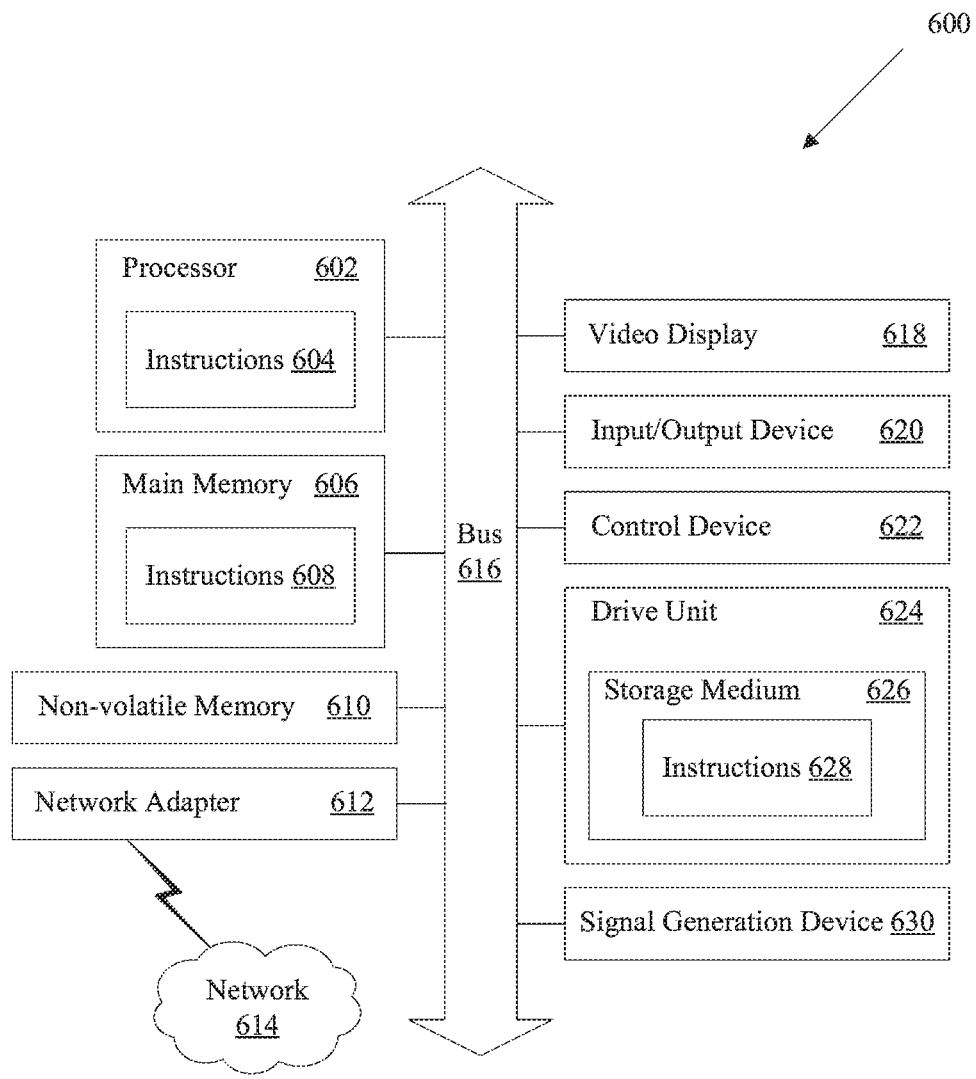
FIG. 6 is a block diagram illustrating an example of a processing system in which at least some operations described herein can be implemented.

FIG. 6 is a block diagram illustrating an example of a processing system 600 in which at least some operations described herein can be implemented. The processing system may include one or more central processing units ("processors") 602, main memory 606, non-volatile memory 610, network adapter 612 (e.g., network interfaces), video display 618, input/output devices 620, control device 622 (e.g., keyboard and pointing devices), drive unit 624 including a storage medium 626, and signal generation device 630 that are communicatively connected to a bus 616.

The bus 616 is illustrated as an abstraction that represents one or more physical buses and/or point-to-point connections that are connected by appropriate bridges, adapters, or controllers. Therefore, the bus 616 can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

In some embodiments the processing system 600 operates as part of a computing device that resides within a targeted network (e.g., endpoint device(s) 212 or network-connected server 210 of FIG. 2), while in other embodiments the processing system 600 is connected (wired or wirelessly) to the computing device. In a networked deployment, the processing system 600 may operate in the capacity of a server or a client machine in a client-server network environment, or as a peer machine in a peer-to-peer network environment.

The processing system 600 may be a server, a personal computer (PC), a tablet computer, a laptop computer, a personal digital assistant (PDA), a mobile phone, a processor, a telephone, a web appliance, a network router, a switch, a bridge, a console, a gaming device, a music player, or any machine capable of executing a set of instructions (sequential or otherwise) that specify actions to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 628. The term "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module or sequence of instructions referred to as "computer programs." The computer programs typically comprise one or more instructions (e.g., instructions 604, 608, 628) set at various times in various memory and storage devices in a computing device, and that, when read and executed by the one or more processors 602, cause the processing system 600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include, but are not limited to, recordable-type media such as volatile and non-volatile memory devices 610, floppy and other removable disks, hard disk drives, optical disks (e.g., Compact Disk Read-Only Memory (CD ROMS), Digital Versatile Disks (DVDs)), and transmission-type media such as digital and analog communication links.

The network adapter 612 enables the processing system 600 to mediate data in a network 614 with an entity that is external to the processing system 600 through any communication protocol supported by the processing system 600 and the external entity. The network adapter 612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 can include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the technology may vary considerably in its implementation details while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments covered by the claims.

The language used in the specification has been principally selected for readability and instructional purposes, and it may not have been selected to delineate or circumscribe the inventive subject matter. It is therefore intended that the scope of the invention not be limited by this Detailed Description, but rather by any claims that issue on an application based hereon. Accordingly, the disclosure of various embodiments is intended to be illustrative, but not limiting, of the scope of the technology.

What is claimed is:

1. A computer-implemented method for obfuscating unauthorized users attempting to penetrate an internal network, the method comprising:
   causing a security module to be installed on a computing device of a plurality of computing devices executing a Microsoft Windows® operating system,
   wherein the plurality of computing devices reside within the internal network;
   generating multiple fictitious identities for the internal network that cannot be used to gain access to the internal network;
   injecting the multiple fictitious identities by the security module into a Local Security Authority Subsystem Service (LSASS) process executed by the Microsoft Windows® operating system of each computing device within the internal network for enforcing a security policy on the computing device;
   determining that an unauthorized user attempted a breach of the internal network including the plurality of computing devices by enforcing the security policy on each computing device and determining that the user attempted to access one computing device of the plurality of computing devices using a fictitious identity of the multiple fictitious identities; and
   responsive to determining that the unauthorized user attempted the breach of the internal network, taking an action to address the attempted breach.

2. The computer-implemented method of claim 1, wherein the LSASS process is responsible for enforcing the security policy on the computing device.

3. The computer-implemented method of claim 1, wherein the LSASS process includes multiple valid identities, each valid identity corresponding to an authorized user permitted to access the internal network.

4. The computer-implemented method of claim 1, further comprising notifying an administrator of the attempted breach in near real time to enable the administrator to take the action before the unauthorized user is able to breach the internal network using a valid identity.

5. A computer-implemented method for obfuscating unauthorized users attempting to penetrate a network, the method comprising:
   causing a security module to be installed on a computing device of a plurality of computing devices that reside within the network;
   generating a fictitious identity for the network;
   injecting the fictitious identity by the security module into an operating system process of each computing device of the plurality of computing devices within the network for enforcing a security policy on the computing device;
   monitoring whether the fictitious identity has been used in an attempt to access the network; and
   in response to determining that an entity attempted to penetrate the network using the fictitious identity to access the computing device of the plurality of computing devices within the network,
      identifying the entity as an unauthorized user of the network; and
      taking an action to address the attempted penetration.

6. The computer-implemented method of claim 5, wherein monitoring whether the fictitious identity has been used in the attempt to access the network comprises performing at least one of:
   continually monitoring attempts to access the network in real time to identify abnormalities; and
   periodically analyzing an access log to identify abnormalities.

7. The computer-implemented method of claim 5, wherein generating the fictitious identity for the network comprises:
   analyzing one or more valid identities to identify an identity syntax; and
   creating the fictitious identity in accordance with the identity syntax so that the fictitious identity is indistinguishable from the one or more valid identities.

8. The computer-implemented method of claim 5, wherein the operating system process includes one or more valid identities corresponding to one or more authorized users of the network.

9. The computer-implemented method of claim 5, wherein the computing device is a server or an endpoint device.

10. The computer-implemented method of claim 5, wherein the network is an internal network associated with an enterprise.

11. The computer-implemented method of claim 5, wherein the computing device executes a Microsoft Windows® operating system, and wherein the operating system process is a Local Security Authority Subsystem Service (LSASS).

12. The computer-implemented method of claim 5, further comprising notifying an administrator of the attempted penetration, and wherein the administrator is responsible for managing the network, the security module, or both.

13. The computer-implemented method of claim 12, wherein notifying the administrator of the attempted penetration comprises performing at least one of:
   transmitting an email message to an email address associated with the administrator;
   transmitting a text message to a phone number associated with the administrator;
   causing a push notification to be presented by an application running on a user device associated with the administrator; and
   causing an alert to be generated by a software program running on a user device associated with the administrator.

14. A system for obfuscating unauthorized users attempting to penetrate a network, the system comprising:
   an identity database configured to store valid network identities used to facilitate a directory service for the network including a plurality of computing devices; and
   a security engine that, when in operation, is hosted by a virtual machine and configured to:
   read the valid network identities from the identity database in order to model the network,
   generate a fictitious network identity that does not permit access to the network, inject the fictitious network identity into each computing device of the plurality of computing devices that reside within the network for enforcing a security policy on the computing device; and
   identify a user as an unauthorized user attempting to penetrate the network including the plurality of computing devices by enforcing the security policy on each computing device and determining that the user attempted to access one computing device of the plurality of computing devices using the fictitious network identity injected into the one computing device.

15. The system of claim 14, wherein the identity database is stored on a directory server that is accessible to all computing devices that reside within the network.

16. The system of claim 15, wherein the identity database includes a valid network identity for each authorized user of the network.

17. The system of claim 14, wherein the virtual machine is physically or virtually installed on a computing device connected to the network.

18. The system of claim 14, wherein the security engine is further configured to: employ one or more artificial intelligence algorithms to discover a syntax characteristic of the valid network identities, wherein discovery of the syntax characteristic allows the security engine to create fictitious network identities that appear substantially identical to the valid network identities.

19. The system of claim 14, wherein each valid network identity is suitable for one or more specific enterprise databases accessible through the network, and wherein the fictitious network entity cannot be used to gain access to any part of the network.

20. The system of claim 14, wherein each computing device executes an operating system, and wherein injecting the fictitious network identity into each computing device of the plurality of computing devices that reside within the network comprises:

installing the fictitious network identity within an operating system process responsible for enforcing the security policy on each computing device.

21. The system of claim 14, wherein the security engine is further configured to, in response to identifying the unauthorized user attempting to penetrate the network, take an action to address the attempted penetration.

* * * * *

UNITED STATES PATENT AND TRADEMARK OFFICE
CERTIFICATE OF CORRECTION

PATENT NO. : 10,637,864 B2  
APPLICATION NO. : 15/588280  
DATED : April 28, 2020  
INVENTOR(S) : Almog Ohayon et al.

Page 1 of 1

It is certified that error appears in the above-identified patent and that said Letters Patent is hereby corrected as shown below:

In the Claims

In Column 14, Line 56, Claim 14, delete "to;" and insert -- to: --, therefor.

Signed and Sealed this  
Thirtieth Day of June, 2020

Andrei Iancu  
*Director of the United States Patent and Trademark Office*